United States Patent
Caty et al.

(10) Patent No.: US 11,940,052 B2
(45) Date of Patent: Mar. 26, 2024

(54) FLOW CONTROL VALVE FOR SUCTION CLEANERS

(71) Applicant: Hayward Industries, Inc., Charlotte, NC (US)

(72) Inventors: Patrick Caty, Lewisville, NC (US); Joseph A. Tessitore, Clemmons, NC (US); Alan R. Levin, Hollywood, FL (US); Gary Ortiz, Clemmons, NC (US)

(73) Assignee: Hayward Industries, Inc., Charlotte, NC (US)

( * ) Notice: Subject to any disclaimer, the term of this patent is extended or adjusted under 35 U.S.C. 154(b) by 364 days.

(21) Appl. No.: 17/311,269

(22) PCT Filed: Dec. 4, 2019

(86) PCT No.: PCT/US2019/064519
§ 371 (c)(1),
(2) Date: Jun. 4, 2021

(87) PCT Pub. No.: WO2020/117964
PCT Pub. Date: Jun. 11, 2020

(65) Prior Publication Data
US 2022/0018449 A1   Jan. 20, 2022

Related U.S. Application Data

(60) Provisional application No. 62/776,184, filed on Dec. 6, 2018.

(51) Int. Cl.
*F16K 1/36* (2006.01)
*A47L 7/00* (2006.01)
(Continued)

(52) U.S. Cl.
CPC .............. *F16K 1/36* (2013.01); *A47L 7/0014* (2013.01); *E04H 4/1645* (2013.01); *F16K 27/02* (2013.01)

(58) Field of Classification Search
CPC .... E04H 4/1645; E04H 4/1636; E04H 4/1654
(Continued)

(56) References Cited

U.S. PATENT DOCUMENTS 2,638,107 A * 5/1953 Teague, Jr. ............. B64D 15/16
  92/37
4,526,186 A * 7/1985 Frentzel ................ E04H 4/1681
  134/167 R
(Continued)

FOREIGN PATENT DOCUMENTS

WO    2012/045310 A1    4/2012

OTHER PUBLICATIONS

International Search Report and Written Opinion of the International Searching Authority, dated Feb. 10, 2020, Issued in connection with International Application No. PCT/US2019/064519 (8 pages).

*Primary Examiner* — Daphne M Barry
(74) *Attorney, Agent, or Firm* — McCarter & English, LLP

(57) ABSTRACT

Improved flow control valve assemblies for fluid systems (e.g., pools or spas) are provided. Advantageous flow control valve assemblies for pool/spa cleaners (e.g., suction pool/spa cleaners) are provided. The present disclosure provides for flow control assemblies for suction pool/spa cleaners, with the cleaners utilized in conjunction with a variable speed pump. A manual valve set-up can be removed from the system, and an advantageous flow control valve assembly can be provided to automatically regulate the flow/suction to the cleaner. The improved flow control valve assembly thereby provides regulated flow to the cleaner, so that if the cleaner remains in the water at low pump speeds, when the pump is later operated at a higher speed the cleaner will function as designed. When there is flow/suction below the (Continued)

desired operating parameters of the cleaner, the pump will operate as desired, and the cleaner is stationary.

25 Claims, 11 Drawing Sheets

(51) Int. Cl.
 *E04H 4/16* (2006.01)
 *F16K 27/02* (2006.01)
(58) Field of Classification Search
 USPC .................. 137/148, 149, 150, 111; 4/490
 See application file for complete search history.

(56) References Cited

U.S. PATENT DOCUMENTS

| | | | | |
|---|---|---|---|---|
| 4,570,660 | A | * | 2/1986 | Chauvier ............... F16K 31/365 |
| | | | | 137/907 |
| 4,643,217 | A | * | 2/1987 | Frentzel ................ F16K 31/528 |
| | | | | 239/572 |
| 5,171,136 | A | | 12/1992 | Pacht |
| 5,477,879 | A | * | 12/1995 | Vos ....................... E04H 4/1654 |
| | | | | 137/513.5 |
| 5,636,975 | A | | 6/1997 | Tiffany et al. |
| 6,854,148 | B1 | | 2/2005 | Rief et al. |
| 9,593,502 | B2 | | 3/2017 | Rief et al. |
| 11,149,458 | B1 | * | 10/2021 | Mjelde ................... E04H 4/1636 |
| 2006/0005890 | A1 | | 1/2006 | Johnsen et al. |
| 2016/0161014 | A1 | | 6/2016 | Lv et al. |

* cited by examiner

FLOW CONTROL VALVE FOR SUCTION CLEANERS

CROSS-REFERENCE TO RELATED APPLICATIONS

The present application is a U.S. National Phase Application under 35 U.S.C. § 371 of International Application No. PCT/US2019/064519, filed on Dec. 4, 2019, which claims the benefit of priority to U.S. Provisional Patent Application Ser. No. 62/776,184, filed on Dec. 6, 2018, the entire disclosures of which are expressly incorporated by reference herein.

FIELD OF THE DISCLOSURE

The present disclosure generally relates to flow control valve assemblies for fluid systems (e.g., pools or spas), and more particularly, to flow control valve assemblies for pool/spa cleaners (e.g., suction pool/spa cleaners).

BACKGROUND OF THE DISCLOSURE

Swimming pools or spas or the like can require an amount of maintenance. For example, in addition to the treatment and filtration of pool or spa water, the bottom wall and/or side walls of a pool or spa may be cleaned periodically. Automated pool/spa cleaners have been developed to move over the pool/spa surfaces, cleaning as they go. Some types of these automated cleaners, which are sometimes referenced as "suction cleaners" or "negative pressure cleaners," are connected via hose to the fluid circulation system of the swimming pool system itself, such as at a port of a swimming pool skimmer. In this regard, as the swimming pool filtration pump operates, pumping and circulating the swimming pool water to be filtered, pool water is "sucked" (1) into the swimming pool cleaner, (2) up and out of the swimming pool cleaner into the hose, and (3) out of the hose into the swimming pool circulation system, e.g., at the skimmer port. In turn, the moving fluid within the swimming pool cleaner can power a turbine, for example, which provides the energy for driving the pool cleaner wheels, for example. Thus, the suction source, i.e., the pumped fluid of the fluid circulation system, induces operation of the automatic pool cleaner. Example reference can be had to U.S. Pat. No. 6,854,148 (Rief), the contents of which are herein incorporated by reference in their entirety.

These suction cleaners typically require a minimum pressure/suction to operate properly. However, in some swimming pool fluid circulation systems, the filtration pump is a variable speed pump/motor, which can induce a variable pressure in the line. Where a suction cleaner is utilized in connection with a swimming pool fluid circulation system having a variable speed pump, it is particularly desirable to have the swimming pool cleaner operate at only those desired pressures, so as to prevent possible damage to the swimming pool cleaner from operating at a pressure that is lower (or higher) than desired. Accordingly, an interest exists for improved flow control assemblies for pool/spa cleaners (e.g., cleaners utilized in conjunction with a variable speed pump). These and other inefficiencies and opportunities for improvement are addressed and/or overcome by the assemblies, systems and methods of the present disclosure.

SUMMARY OF THE DISCLOSURE

The present disclosure provides for improved flow control valve assemblies for fluid systems. More particularly, the present disclosure provides for advantageous flow control valve assemblies for pool/spa cleaners.

In exemplary embodiments, the present disclosure provides for improved flow control valve assemblies and related features, systems and methods of use.

In some embodiments, the present disclosure provides for advantageous flow control assemblies for suction pool/spa cleaners, with the suction cleaners utilized in conjunction with a variable speed pump or the like.

The present disclosure provides that a conventional manual valve set-up can be replaced or removed from the fluid system, and an advantageous flow control valve assembly can be provided to automatically set or regulate the flow/suction to the cleaner. The improved flow control valve assembly thereby provides regulated flow to the cleaner, so that if the suction cleaner remains in the water (e.g., during a lower pump speed setting), when the pump is later operated at a higher speed the suction cleaner will function/move as designed.

When there is flow/suction below the desired operating parameters of the cleaner, the pump will operate as desired, and the suction cleaner will be stationary.

The exemplary flow control valve assembly can also maintain the suction cleaner at the designed flow/suction parameters, even when the furnished pump flow/suction of the fluid system is above the designed flow/suction of the cleaner.

Additional advantageous features, functions and applications of the disclosed assemblies, systems and methods of the present disclosure will be apparent from the description which follows, particularly when read in conjunction with the appended figures. References listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1:
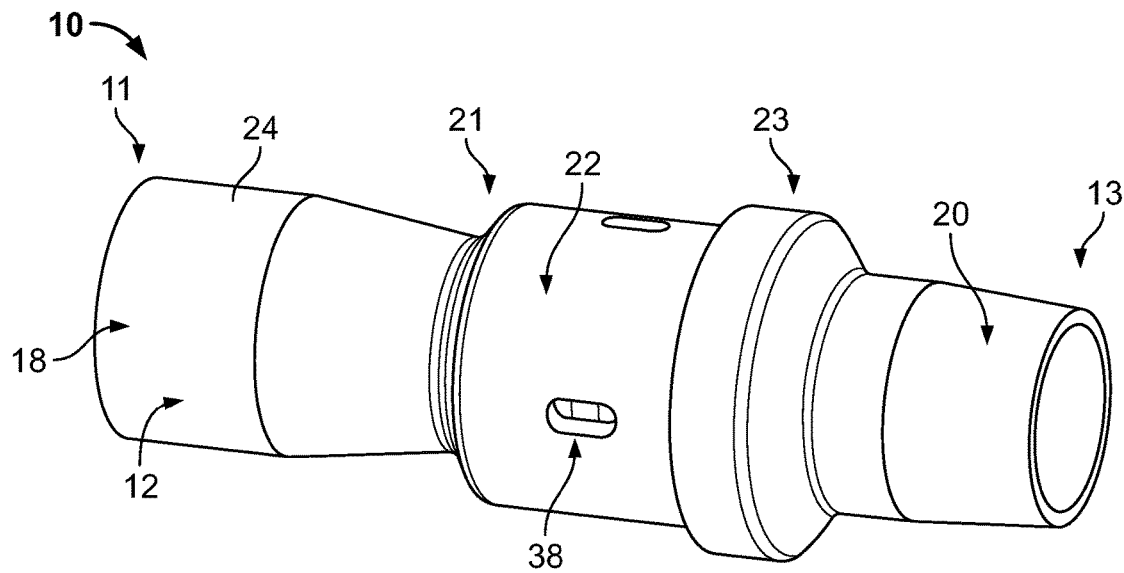
Figure 2:
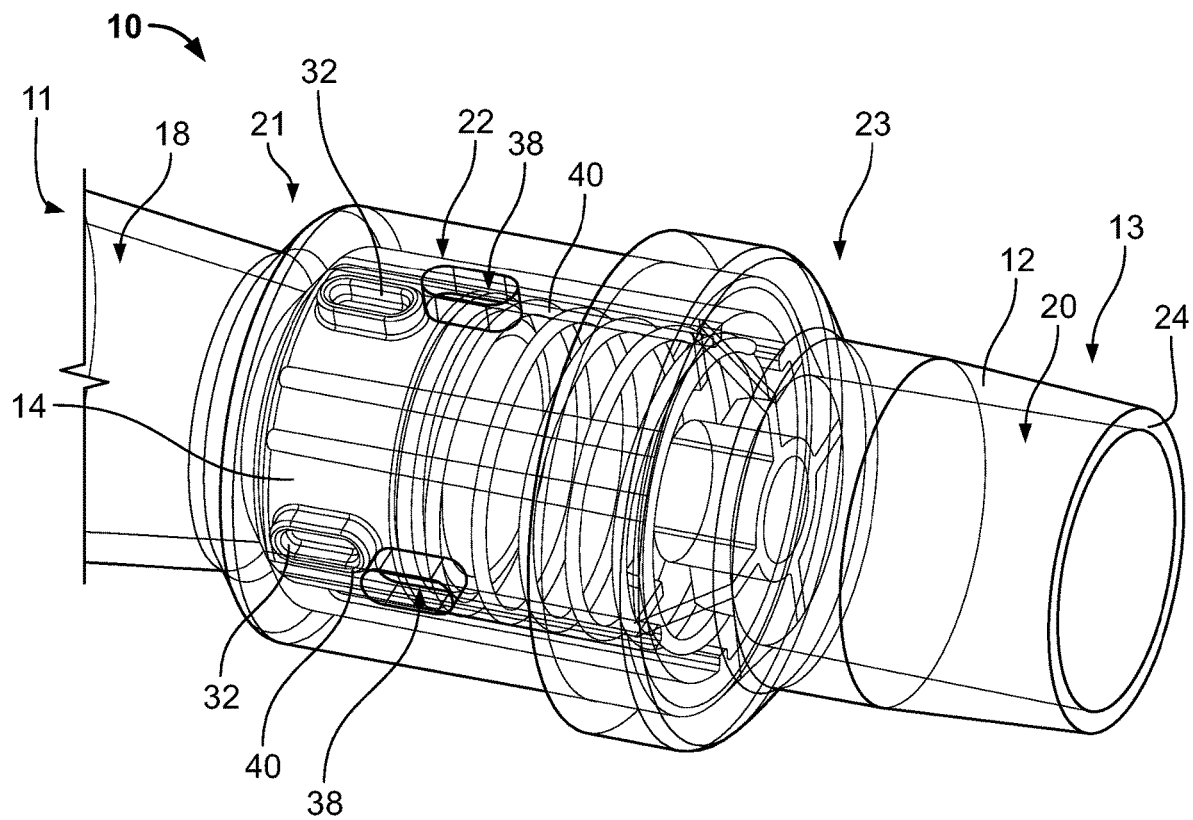
Figure 3:
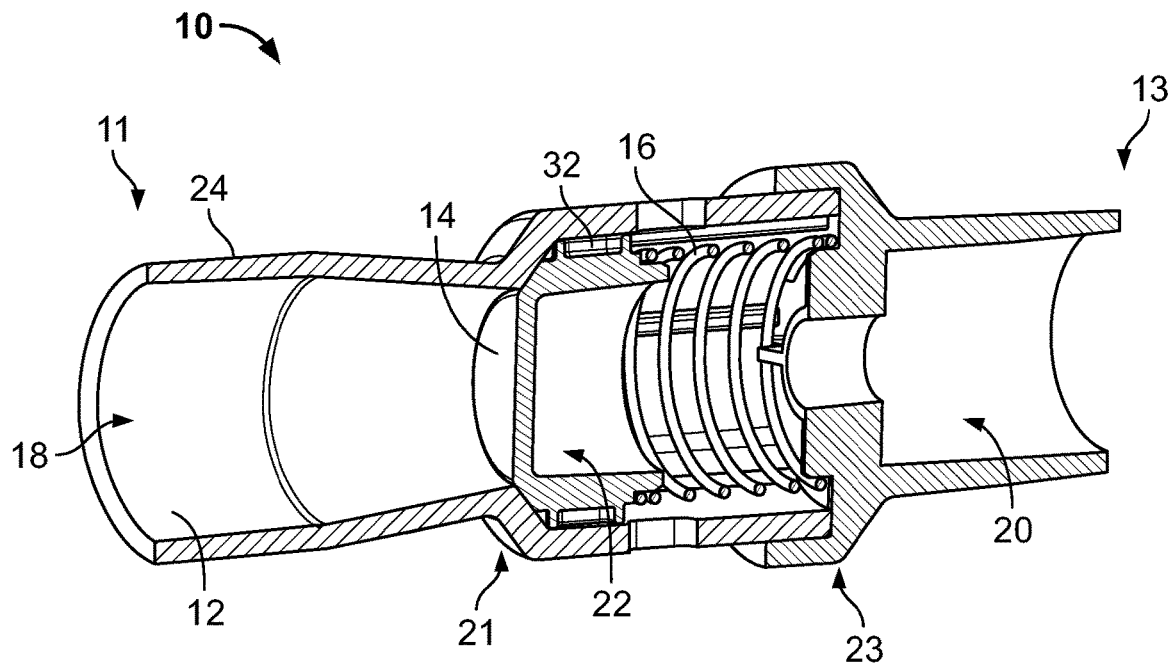
Figure 4:
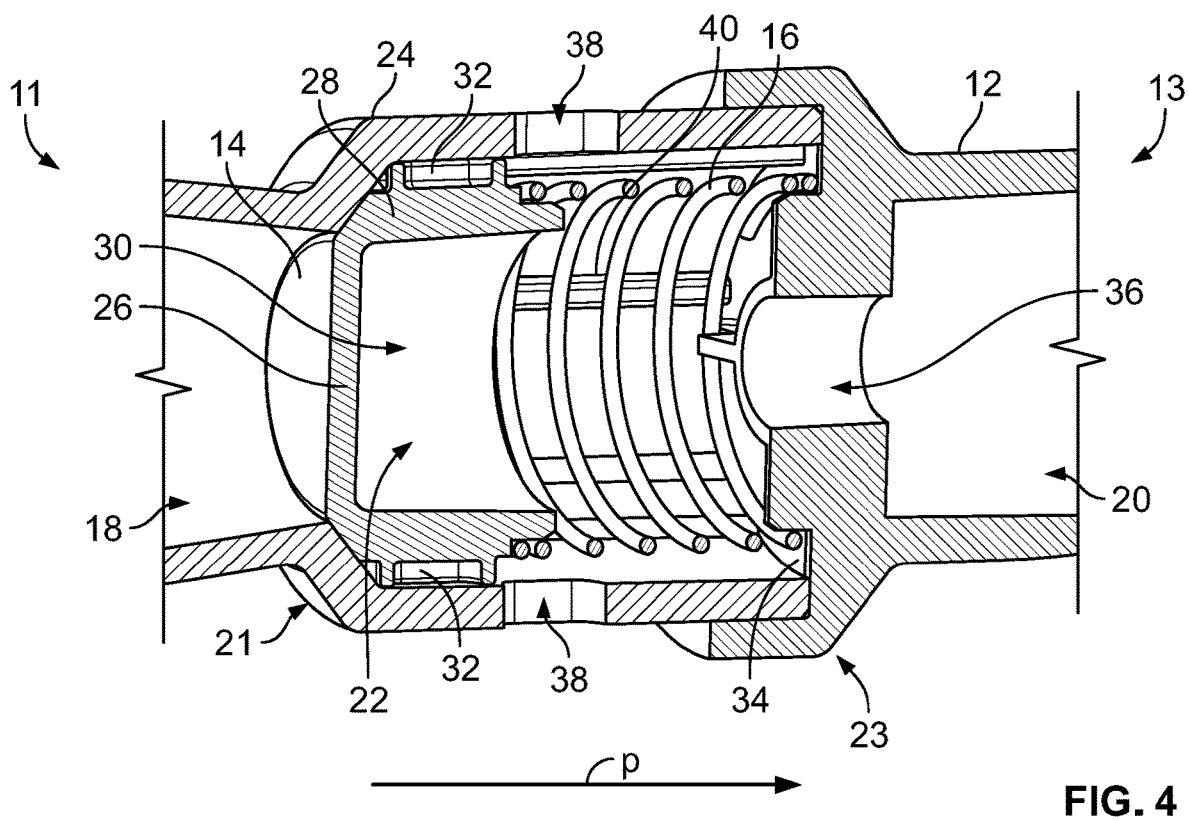
Figure 5:
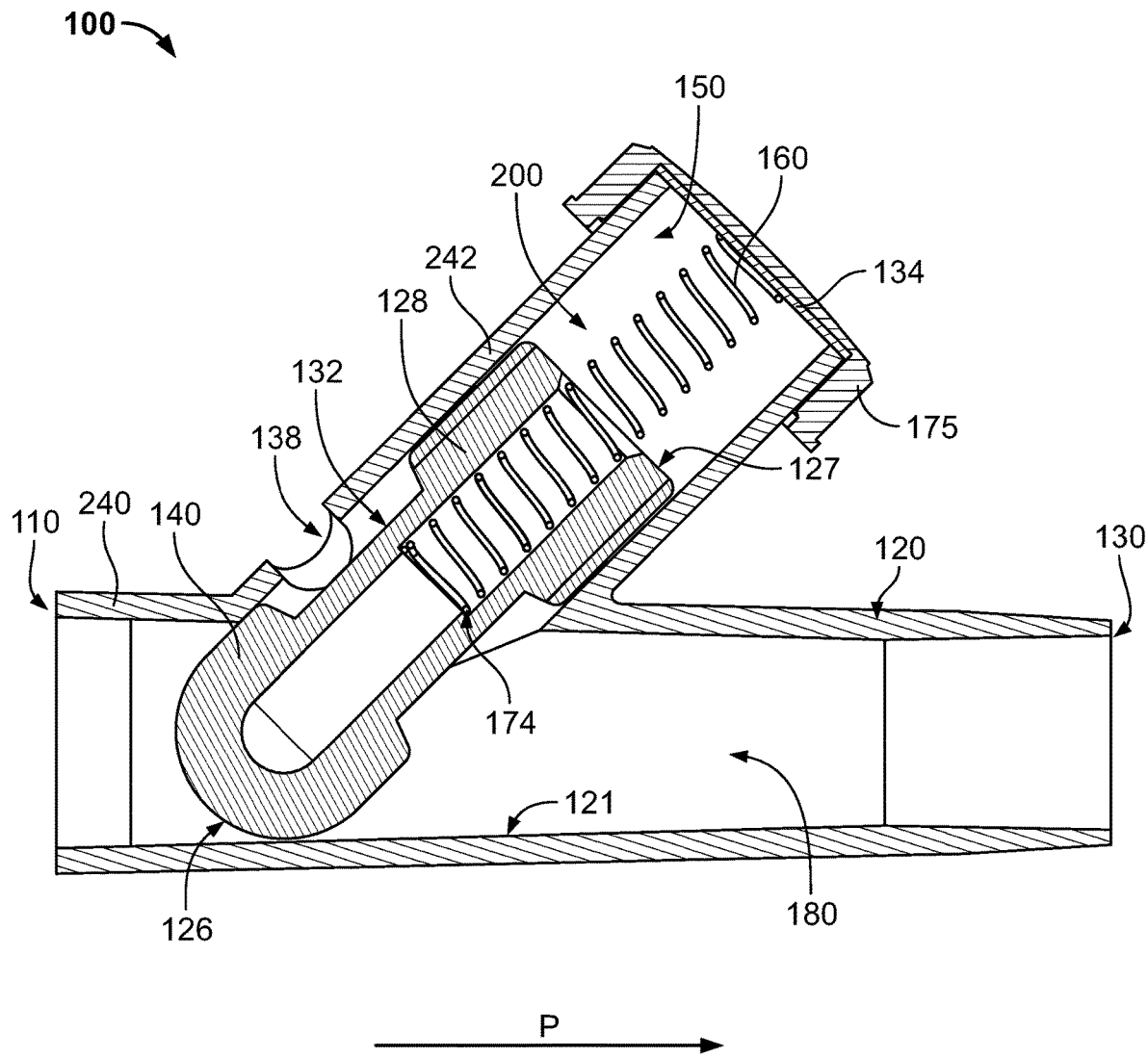
Figure 6:
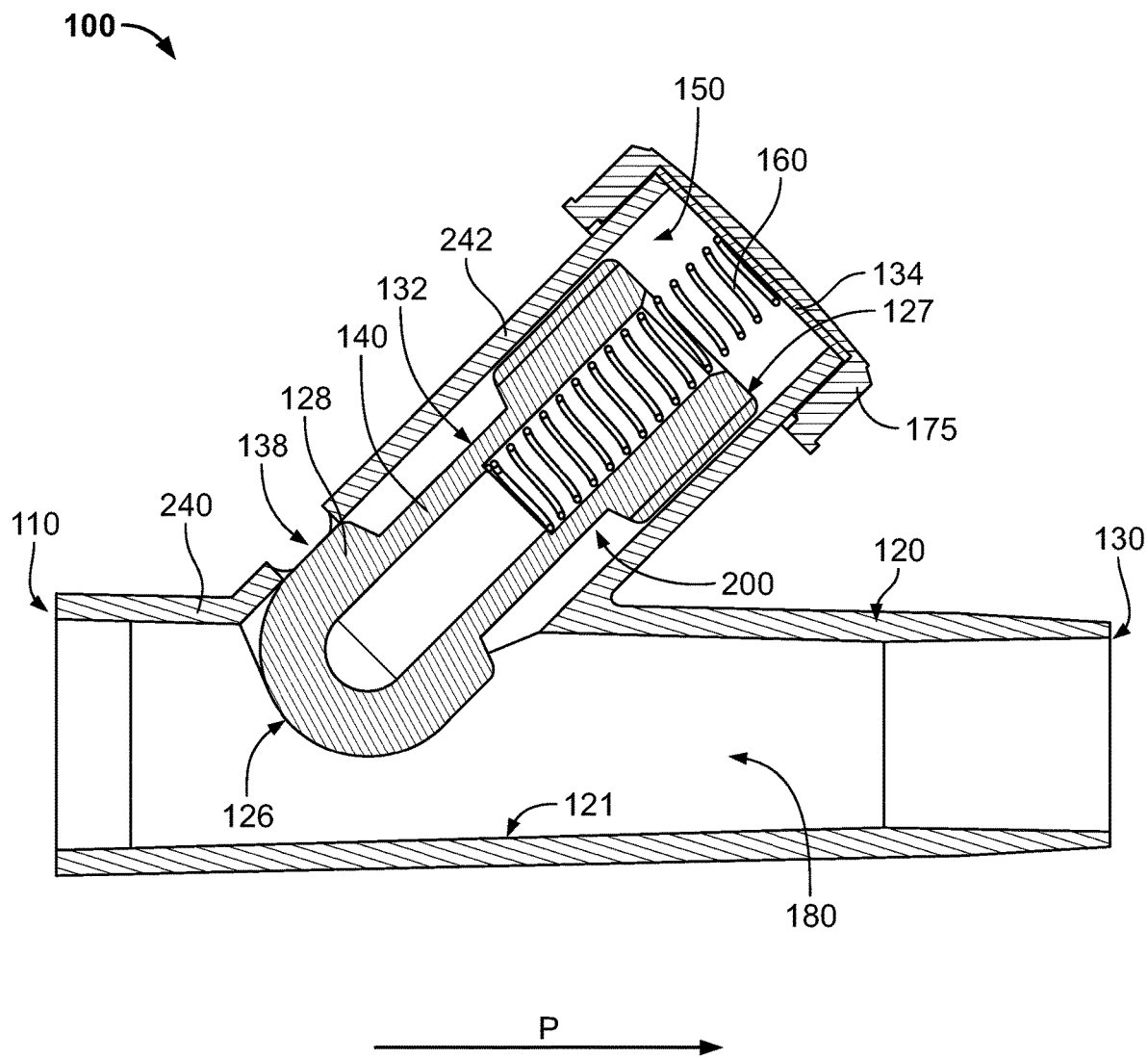
Figure 7:
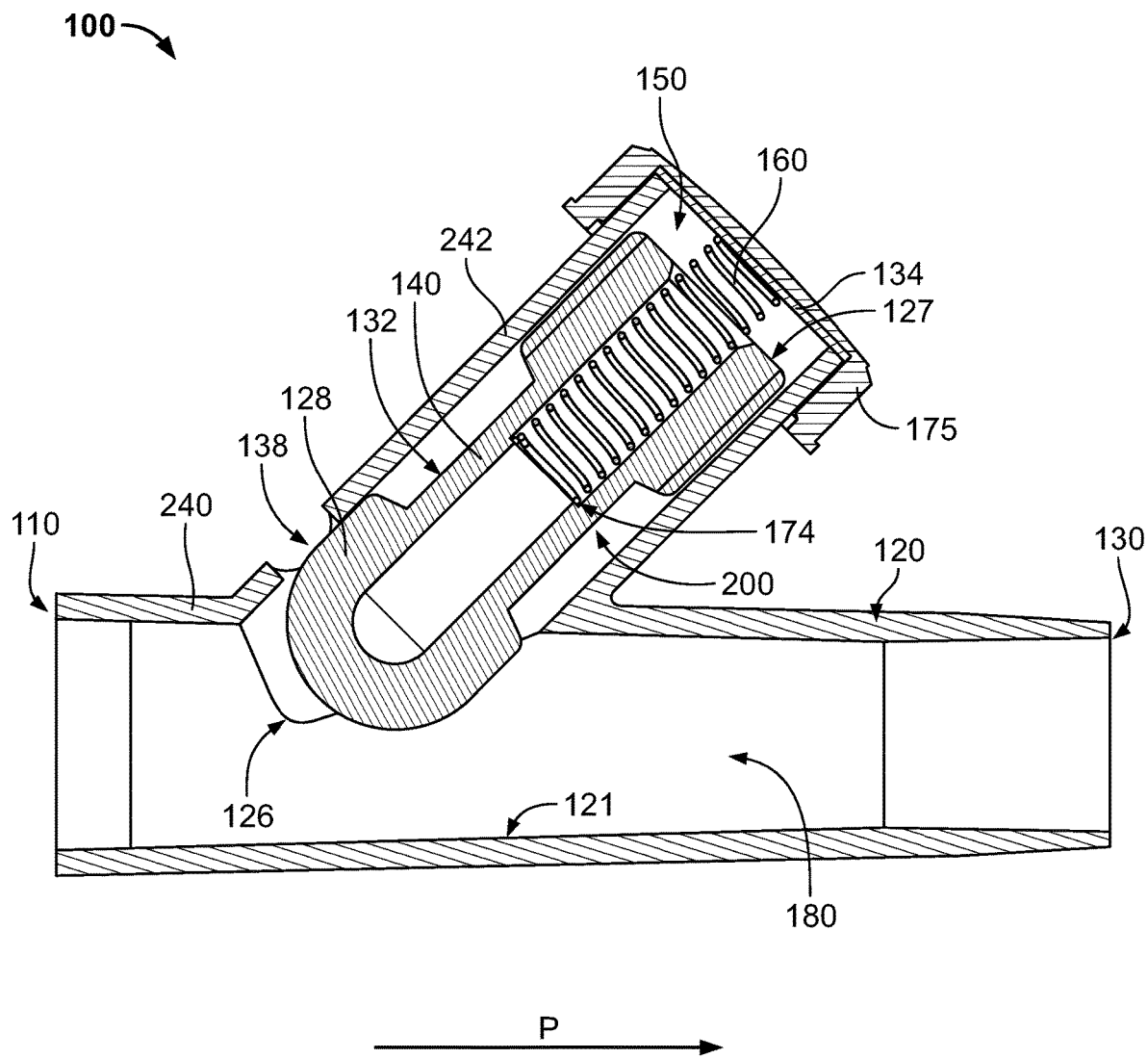
Figure 8:
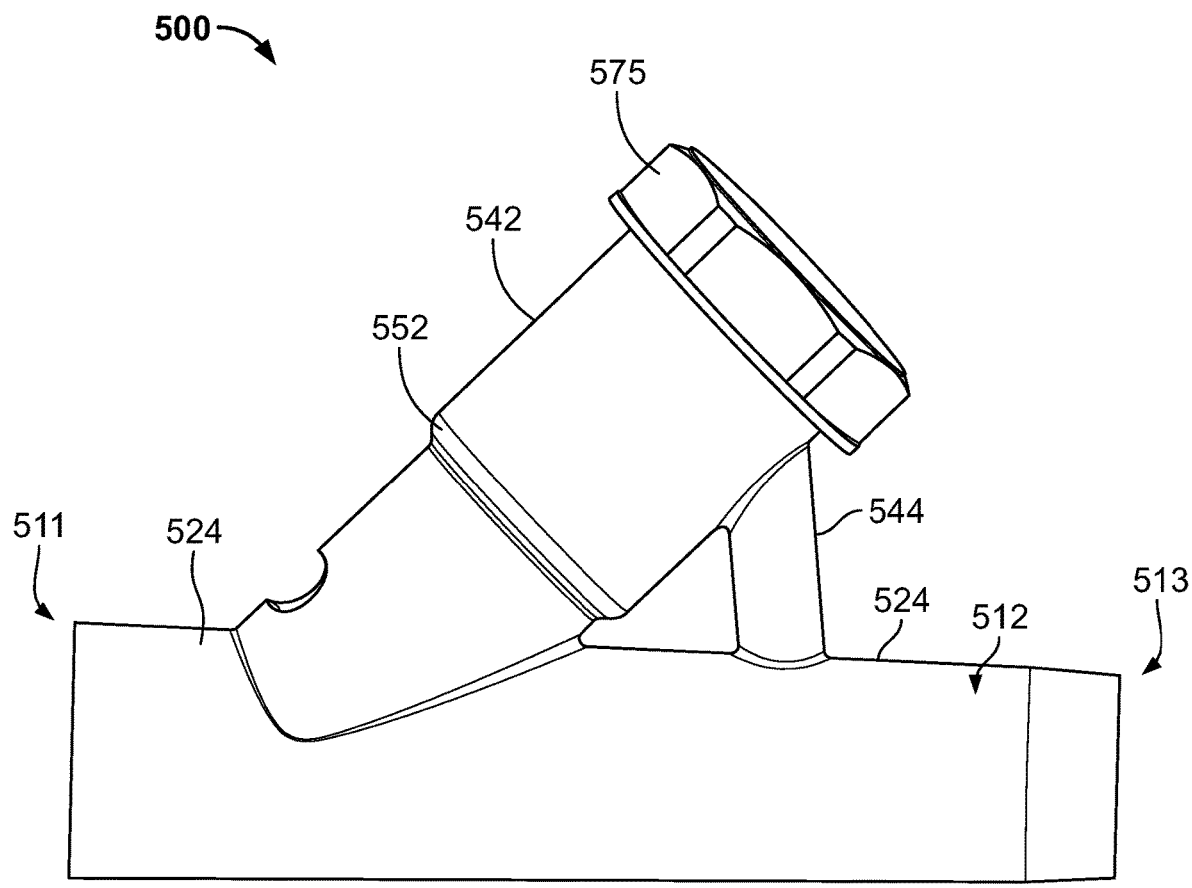
Figure 9:
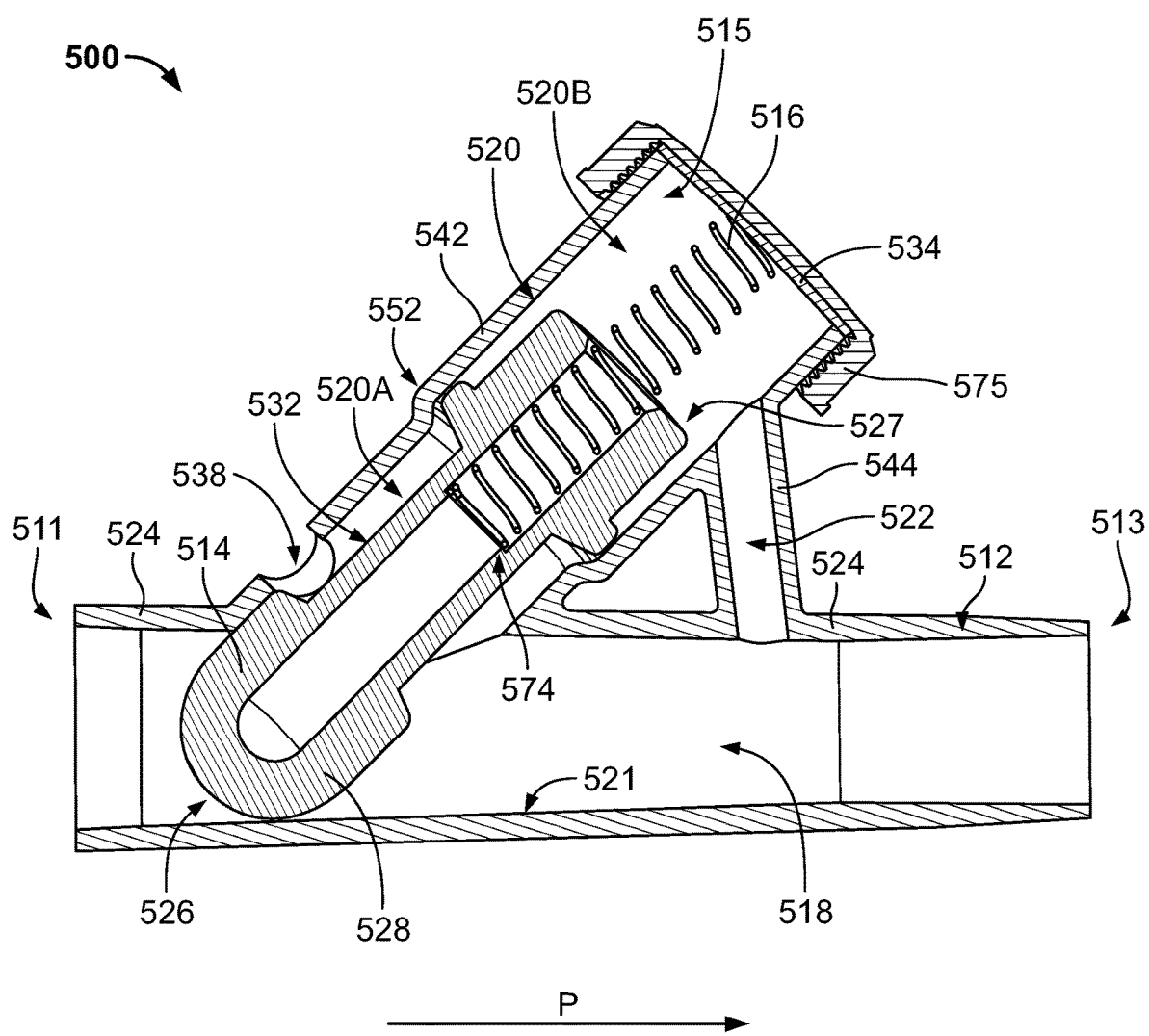
Figure 10:
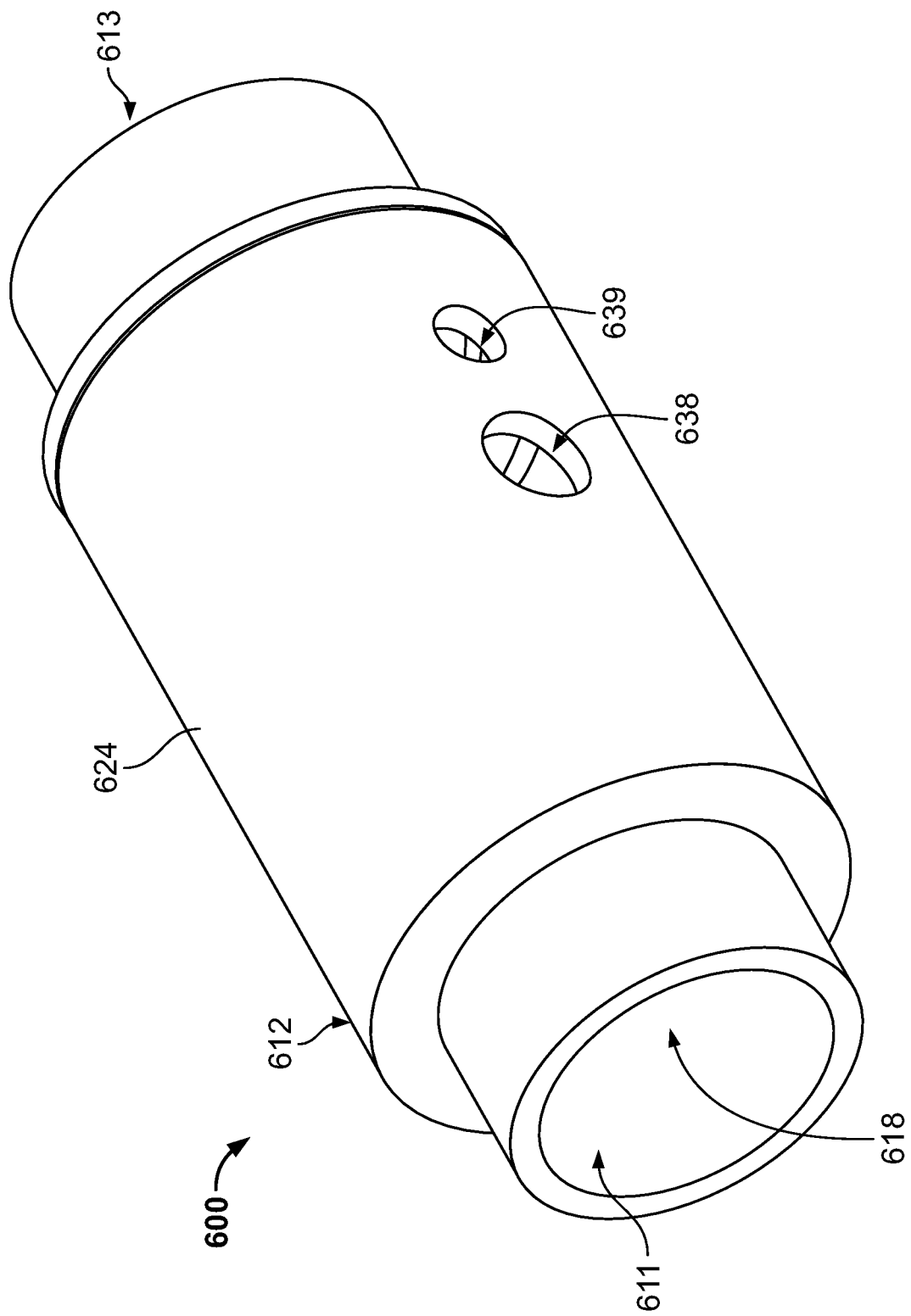
Figure 11:
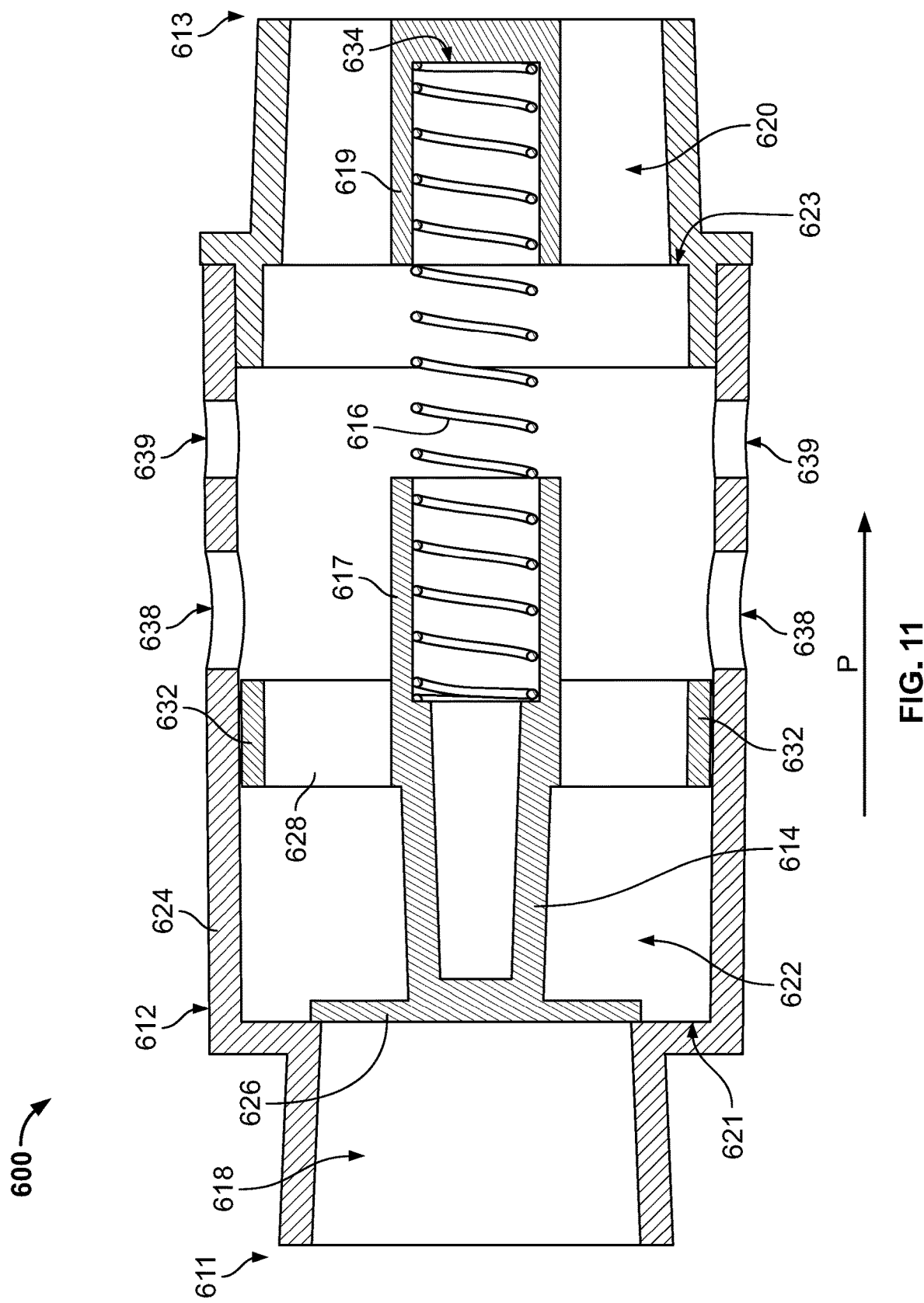
Figure 12:
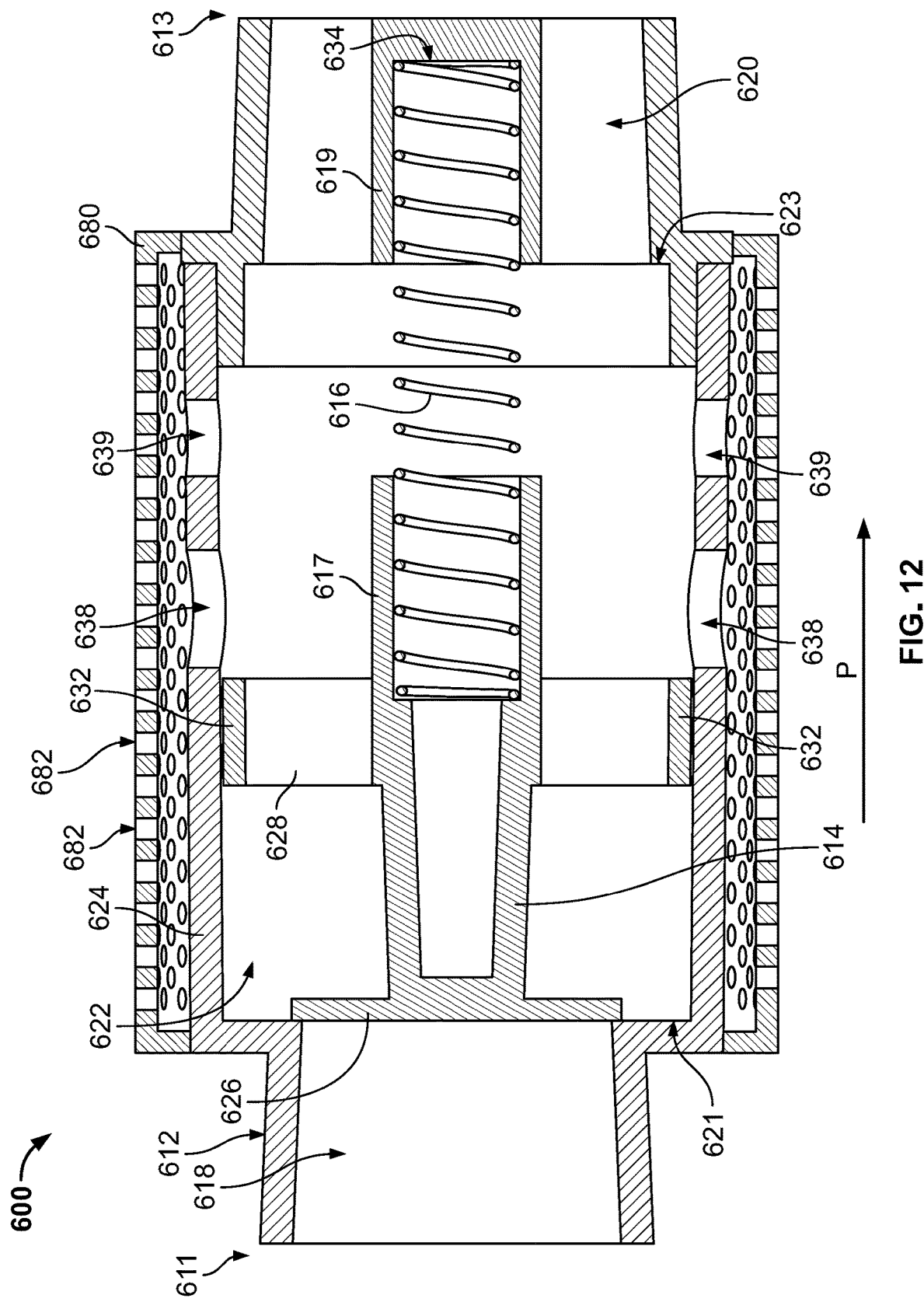
Figure 13:
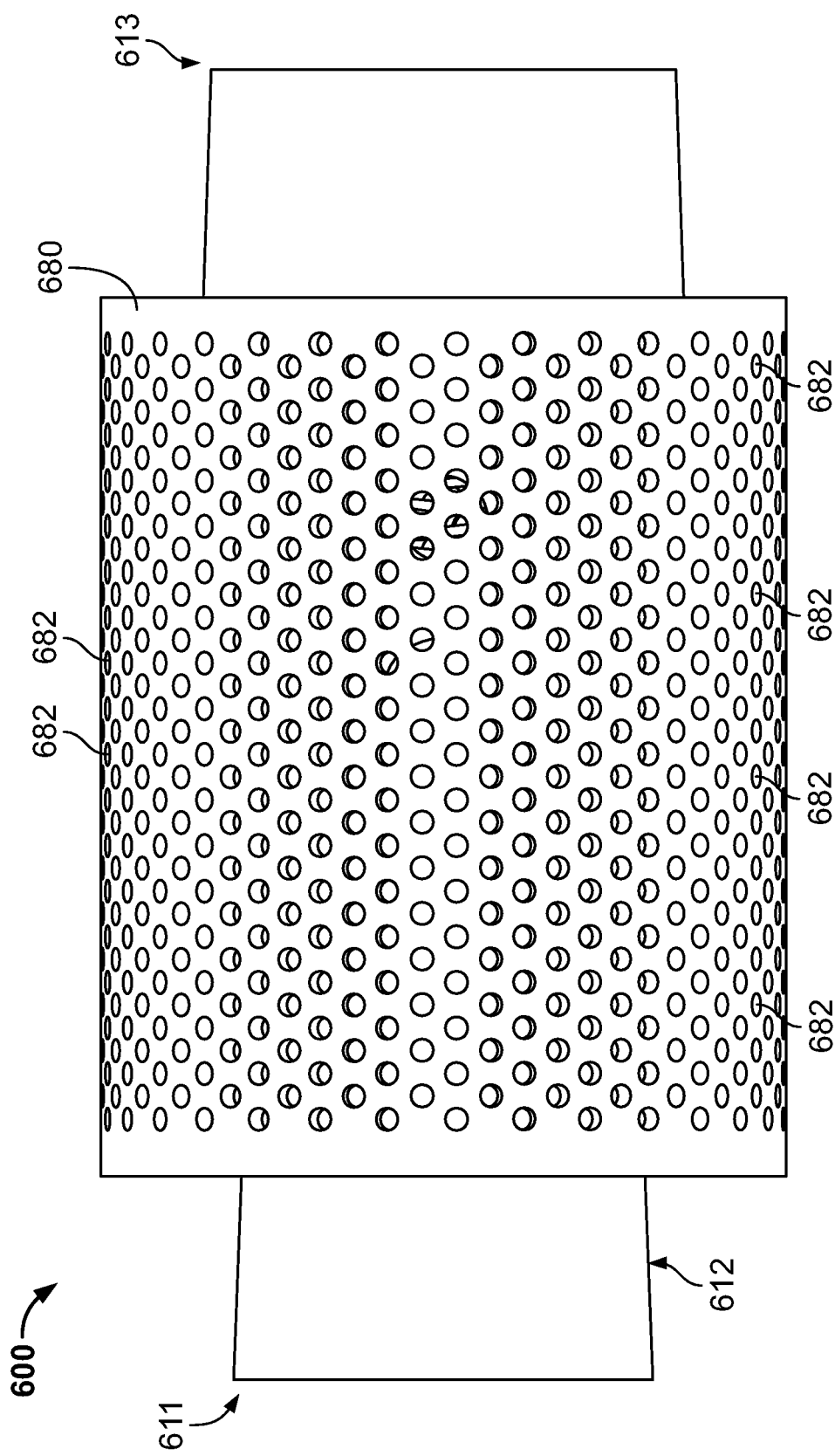

To assist those of ordinary skill in the art in making and using the disclosed assemblies, systems and methods, reference is made to the appended figures, wherein:

FIG. 1 is a schematic view of a flow control valve assembly according to an exemplary embodiment of the present disclosure;

FIG. 2 is a partial exploded view of the flow control valve assembly of FIG. 1;

FIG. 3 is a cross-sectional side perspective view of the flow control valve assembly of FIG. 1;

FIG. 4 is a partial exploded view of the flow control valve assembly of FIG. 3;

FIGS. 5-7 are cross-sectional side views of another exemplary flow control valve assembly of the present disclosure;

FIG. 8 is a side view of another exemplary flow control valve assembly of the present disclosure;

FIG. 9 is a cross-sectional side view of the flow control valve assembly of FIG. 8;

FIG. 10 is a side perspective view of another exemplary flow control valve assembly of the present disclosure;

FIG. 11 is a cross-sectional side view of the flow control valve assembly of FIG. 10;

FIG. 12 is a cross-sectional side view of the flow control valve assembly of FIG. 10, with a screen member mounted thereto; and FIG. 13 is a side view of the flow control valve assembly of FIG. 12.

DETAILED DESCRIPTION OF DISCLOSURE

The exemplary embodiments disclosed herein are illustrative of advantageous flow control valve assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary flow control valve assemblies/fabrication methods and associated processes/techniques of assembly and use are not to be interpreted as limiting, but merely as the basis for teaching one skilled in the art how to make and use the advantageous flow control valve assemblies/systems of the present disclosure.

The present disclosure provides for improved flow control valve assemblies for fluid systems (e.g., for pools or spas). More particularly, the present disclosure provides for advantageous flow control valve assemblies for pool/spa cleaners (e.g., for suction pool/spa cleaners). In exemplary embodiments, the present disclosure provides for improved flow control valve assemblies and related features, systems and methods of use.

In certain embodiments, the present disclosure provides for advantageous flow control assemblies for suction pool/spa cleaners, with the suction cleaners utilized in conjunction with a variable speed pump or the like.

When the circulation system, in addition, includes a pump that has more than one speed (e.g., a variable speed pump), some users remove the cleaner from the pool/spa when the pump is operated in a lower speed setting. There are some reasons for this removal of the cleaner at lower speed settings, including, without limitation: (i) the suction cleaner can tangle the hose with inadequate flow/vacuum; (ii) the cleaner parts can wear with use; and/or (iii) the suction cleaner may stay in a small area and wear a hole in a liner or the like of the pool/spa.

In addition, suction pool cleaners can be designed to operate within a flow/suction range. With flow in excess of the design parameters, the parts can wear and the cleaner may not provide the desired surface coverage.

A conventional set up of a suction cleaner includes having to manually adjust the flow/suction from the pump utilizing a valve at one end of the hose (e.g., proximal to the suction system and/or pump), and to utilize a flow gauge positioned at the other end of the hose proximal to the suction cleaner, with the hose connecting the cleaner to the suction system and/or pump.

In exemplary embodiments, the present disclosure provides for improved assemblies/methods for utilizing flow control valve assemblies for pool/spa cleaners (e.g., for suction pool/spa cleaners). The present disclosure provides for advantageous flow control assemblies for suction pool/spa cleaners, with the suction cleaners utilized in conjunction with a variable speed pump or the like.

More particularly, the present disclosure provides that a conventional manual set-up can be replaced or removed from the system, and an advantageous flow control valve assembly can be provided to automatically set or regulate the flow/suction to the cleaner. The improved flow control valve assembly thereby provides regulated flow to the cleaner, so that if the suction cleaner remains in the water (e.g., during a lower pump speed setting), when the pump is thereafter engaged to a higher speed the suction cleaner will operate/move as designed. When there is flow/suction below the desired operating parameters of the cleaner, the pump will operate as desired, and the suction cleaner will be stationary and not move.

Another exemplary additional function of the present disclosure is to maintain the suction cleaner at the designed flow/suction requirements of the cleaner, even when the furnished pump flow/suction of the fluid system is above the designed flow/suction of the cleaner. As such, the above noted improvements of the systems/assemblies of the present disclosure thereby eliminate drawbacks of conventional designs, and also provide significant operational, commercial and/or manufacturing advantages as a result.

Referring now to the drawings, like parts are marked throughout the specification and drawings with the same reference numerals, respectively. Drawing figures are not necessarily to scale and in certain views, parts may have been exaggerated for purposes of clarity.

Referring now to FIGS. 1-4, there is illustrated a flow control valve assembly 10 according to exemplary embodiments of the present disclosure. Exemplary flow control valve assembly 10 can be utilized in fluid systems (e.g., pool or spa systems) as a flow control assembly. More particularly, flow control valve assembly 10 can be utilized in pool or spa systems as a flow control assembly for pool/spa cleaners (e.g., cleaners utilized in conjunction with a variable speed pump).

In exemplary embodiments, a remote suction system includes at least one pump (e.g., variable speed pump) that is connected via a hose or the like to the cleaner for cleaning purposes. The flow control valve assembly 10 can be connected to the fluid system (e.g., connected to the hose) for flow control purposes, as discussed further below.

Exemplary flow control valve assembly 10 includes body member 12, plug member 14 and spring member 16. Exemplary body member 12 of flow control valve assembly 10 takes the form of a substantially cylindrical body member 12, although the present disclosure is not limited thereto. Rather, body member 12 of flow control valve assembly 10 can take a variety of forms and/or shapes.

As shown in FIGS. 1-4, the body member 12 of flow control valve assembly 10 extends from a first open end 11 to a second open end 13 (e.g., extends about 6.5 inches from first open end 11 to second open end 13). Hose segments of the hose of the fluid system (e.g., pool or spa cleaner system) can be configured to connect to first and second open ends 11, 13. In some embodiments, first open end 11 can be connected to the cleaner of the fluid system.

Body member 12 includes a first lumen or cavity 18 that extends from first open end 11 to interior chamber 22 of body member 12. Body member 12 also includes a second lumen or cavity 20 that extends from second open end 13 to interior chamber 22 of body member 12. Exemplary interior chamber 22 extends from first chamber end 21 to second chamber end 23. As such, first lumen 18 extends from first open end 11 to first chamber end 21, and second lumen 20 extends from second open end 13 to second chamber end 23.

Outer wall 24 of body member 12 surrounds and defines first lumen 18, second lumen 20 and interior chamber 22.

A plug member 14 is positioned within interior chamber 22 of body member 12. In exemplary embodiments and as shown in FIG. 4, plug member 14 is first positioned so that a plug wall 26 is positioned against first chamber end 21, and plug wall 26 is configured and dimensioned to prevent fluid to flow from first lumen 18 to interior chamber 22 when plug wall 26 is in the first position against first chamber end 21. In such a position, the pump suction is to the right of second end 13 of second lumen 20 in the direction of Arrow P, and the cleaner is positioned to the left of first end 11 of first lumen 18.

As discussed further below and as shown in FIG. 4, plug member 14 also includes an extension wall 28 that extends from plug wall 26 and surrounds an interior cavity 30, the extension wall 28 including one or more protruding cover members 32. In exemplary embodiments, extension wall 28 includes four protruding cover members 32 spaced (e.g., spaced radially) around extension wall 28 (e.g., with the protruding cover members 32 spaced equidistantly apart from one another about 90° from each other around extension wall 28).

In other embodiments, extension wall 28 includes other variations of protruding cover members 32 (e.g., two spaced about 180° apart from each other around extension wall 28; three spaced about 120° apart from each other around extension wall 28; etc.).

As shown in FIG. 4, a spring member 16 is positioned against a surface of the outer wall 28 of plug member 14, with the spring member 16 extending from the plug member 14 to an abutment wall 34 positioned proximal to second chamber end 23 of interior chamber 22. Exemplary abutment wall 34 includes one or more apertures 36 therethrough to allow fluid to flow through abutment wall 34.

The outer wall 24 of body member 12 that surrounds and defines interior chamber 22 includes one or more slots 38 therethrough. In exemplary embodiments, outer wall 24 includes four slots 38 spaced (e.g., spaced radially) around outer wall 24 (e.g., with the slots 38 spaced equidistantly apart from one another about 90° from each other around outer wall 24).

In other embodiments, outer wall 24 includes other variations of slots 38 (e.g., two spaced about 180° apart from each other around outer wall 24; three spaced about 120° apart from each other around outer wall 24; etc.).

In exemplary embodiments, the interior chamber 22 includes one or more interior rib members 40 extending along an interior surface of outer wall 24, each interior rib member 40 configured and dimensioned to maintain the orientation of the protruding cover members 32 in alignment (e.g., axial alignment) with a respective slot 38.

In use, the flow control valve assembly 10 is configured to provide sufficient flow area to allow the pump to maintain the circulation in the fluid system, when the pump is set below the required suction cleaner required flow (e.g., when the pump provides inadequate vacuum to operate the cleaner). Then, as the flow/vacuum of the pump/system increases to the desired level of the suction cleaner, the flow control valve assembly 10 can shift the flow into the suction cleaner in order to operate the suction cleaner.

The flow control valve assembly 10 includes an inline arrangement of the plug member 14 and spring member 16 that allows for high flows with low head loss. As noted above and as shown in FIG. 4, plug member 14 can be first positioned so that plug wall 26 is positioned against first chamber end 21, with the plug wall 26 preventing fluid to flow from first lumen 18 to interior chamber 22 when plug wall 26 is in the first position against first chamber end 21. In such a position, the pump suction is to the right of second end 13 of second lumen 20 in the direction of Arrow P, and the cleaner is positioned to the left of first end 11 of first lumen 18.

Also in the position as shown in FIG. 4, the one or more slots 38 are configured to allow fluid (e.g., pool or spa water) to flow from the pool or spa and into the interior chamber 22, and thereafter flow through aperture 36 and through second lumen 20 and towards the pump suction to the right of second end 13 in the direction of Arrow P. This provides the flow back to the pump in this position as depicted in FIG. 4. As such and as shown in FIG. 4, pump suction of the fluid system is maintained, while the flow through the suction cleaner is stopped.

With reference again to FIG. 4, as the flow/suction to the pump (e.g., to the right of second end 13 in the direction of Arrow P) is increased by a change in speed of the pump, the additional flow/suction shifts the plug member 14 to the right in the direction of Arrow P, and the plug member 14 can move to a second position (e.g., via compression of spring member 16) that thereby covers the provided flow paths of slots 38 from the pool/spa water, while opening a flow path from the suction cleaner.

More particularly, when the plug member 14 shifts to the right in the direction of Arrow P to the second position, each protruding cover member 32 is configured to cover a respective slot 38 to prevent fluid to flow through each slot 38 to the interior chamber 22, and the plug member 14 is also now positioned so that plug wall 26 is positioned away from first chamber end 21, with the plug wall 26 allowing fluid to flow around wall 26 and into chamber 22 from first lumen 18 to interior chamber 22 when plug wall 26 is in the second position away from first chamber end 21. Fluid can then flow through aperture 36 and through second lumen 20 and towards the pump suction to the right of second end 13 in the direction of Arrow P, thereby allowing the suction cleaner to operate/move.

In exemplary embodiments, the slots 38 and protruding cover members 32 are sized and configured such that when the entire flow is through the suction cleaner, the cleaner is within its designed operating conditions.

If the pump provides flow/suction above/beyond the designed operation conditions of the cleaner, the plug member 14 will move further to the right in the direction of Arrow P (e.g., to a third position via compression of spring member 16), and each protruding cover member 32 will start to provide at least a partial opening through a respective slot 38 to bypass some flow/suction to the cleaner by allowing some fluid flow from the pool/spa to pass through at least partially opened slots 38 to chamber 22 and then to second lumen 20 and then to the pump.

As such, the present disclosure provides for improved systems/methods for utilizing flow control valve assemblies 10 for pool/spa cleaners (e.g., for suction pool/spa cleaners, with the suction cleaners utilized in conjunction with a variable speed pump or the like).

More particularly, the present disclosure provides that a conventional manual set-up can be replaced or removed from the system, and an advantageous flow control valve assembly 10 can be provided to automatically set or regulate the flow/suction to the cleaner. The improved flow control valve assembly 10 thereby provides regulated flow to the cleaner, so that if the suction cleaner remains in the water (e.g., during a lower pump speed setting), when the pump is thereafter engaged to a higher speed the suction cleaner will operate/move as designed. When there is flow/suction below the desired operating parameters of the cleaner, the pump will operate as desired, and the suction cleaner will be stationary and not move.

Another exemplary additional function of the advantageous flow control valve assembly 10 is to maintain the suction cleaner at the designed flow/suction requirements of the cleaner, even when the furnished pump flow/suction of the fluid system is above the designed flow/suction of the cleaner. As such, the above noted improvements of the systems/assemblies 10 of the present disclosure thereby eliminate drawbacks of conventional designs, and also provide significant operational, commercial and/or manufacturing advantages as a result.

FIGS. 5-7 show cross-sectional side perspective views of another exemplary flow control valve assembly 100 of the present disclosure.

Similar to assembly 10, exemplary flow control valve assembly 100 can be utilized in fluid systems (e.g., pool or spa systems) as a flow control assembly. More particularly, flow control valve assembly 100 can be utilized in pool or spa systems as a flow control assembly for pool/spa cleaners (e.g., cleaners utilized in conjunction with a variable speed pump).

In general, a remote suction system includes at least one pump (e.g., variable speed pump) that is connected via a hose or the like to the cleaner for cleaning purposes. The flow control valve assembly 100 can be connected to the fluid system (e.g., connected to the hose) for flow control purposes.

Exemplary flow control valve assembly 100 includes body member 120, plug or plunger member 140 and spring member 160.

Body member 120 of flow control valve assembly 100 extends from a first open end 110 to a second open end 130.

Hose segments of the hose of the fluid system (e.g., pool or spa cleaner system) can be configured to connect to first and second open ends 110, 130. In some embodiments, first open end 110 can be connected to the cleaner of the fluid system.

Body member 120 includes a first lumen or cavity 180 that extends from first open end 110 to second open end 130.

Body member 120 also includes a second lumen or cavity 200 that extends from first outer wall 240 of body member 120 to a third end 150. Third end 150 can be closed off by a mounted cap member 175 or the like. Second lumen 200 is configured and dimensioned to at least partially house or contain plug member 140 and spring member 160.

First outer wall 240 of body member 120 surrounds and defines first lumen 180. Second outer wall 242 of body member 120 extends from first outer wall 240 to third end 150, and second outer wall 242 of body member 120 surrounds and defines second lumen 200.

A plug or plunger member 140 is positioned at least partially within second lumen 200.

In exemplary embodiments and as shown in FIG. 5, plug member 140 is first positioned so that a first plug end 126 is positioned against or proximal to inner wall 121 of first lumen 180.

In such a position as shown in FIG. 5, the first plug end 126 of plug member 140 is configured and dimensioned to substantially prevent fluid to flow from first open end 110 to second open end 130.

In such a position, the pump suction is to the right of second end 130 of first lumen 180 in the direction of Arrow P, and the cleaner is positioned to the left of first end 110 of first lumen 180.

Plug member 140 also includes an extension wall 128 that extends from first plug end 126 to second plug end 127. Extension wall 128 includes one or more openings 132 therethrough.

Spring member 160 can be positioned against an inner surface 174 of plug member 140, with the spring member 160 extending from the inner surface 174 of plug member 140 to an abutment wall 134 of cap member 175 mounted to third end 150. It is noted that the mounting of cap member 175 to third end 150 is adjustable, thereby allowing a user to adjust the stiffness or looseness of the compression of spring member 160 positioned between inner surface 174 and abutment wall 134 as shown in FIG. 5.

The second outer wall 242 of body member 120 that surrounds and defines lumen 200 includes one or more slots 138 therethrough.

In use, the flow control valve assembly 100 is configured to provide sufficient flow area to allow the pump to maintain the circulation in the fluid system, when the pump is set below the required suction cleaner required flow (e.g., when the pump provides inadequate vacuum to operate the cleaner). Then, as the flow/vacuum of the pump/system increases to the desired level of the suction cleaner, the flow control valve assembly 100 can shift the flow into the suction cleaner in order to operate the suction cleaner.

The flow control valve assembly 100 includes an arrangement of the plug member 140 and spring member 160 that allows for high flows with low head loss. As shown in FIG. 5, plug member 140 can be first positioned so that a first plug end 126 is positioned against or proximal to inner wall 121 of first lumen 180, with the first plug end 126 substantially preventing fluid to flow from first open end 110 to second open end 130.

In such a position, the pump suction is to the right of second end 130 in the direction of Arrow P, and the cleaner is positioned to the left of first end 110.

Also in the position as shown in FIG. 5, the one or more slots 138 of second outer wall 242 and the one or more openings 132 of extension wall 128 of plug member 140 are configured to allow fluid (e.g., pool or spa water) to flow from the pool or spa and through the slots 138 and openings 132 and through or around plug member 140 and to the lumen 180 positioned to the right of plug member 140 in FIG. 5, and thereafter flow through lumen 180 and towards the pump suction to the right of second end 130 in the direction of Arrow P. This provides the flow back to the pump in this position as depicted in FIG. 5. As such and as shown in FIG. 5, pump suction of the fluid system is maintained, while the flow through the suction cleaner is stopped.

With reference to FIGS. 5-6, as the flow/suction to the pump (e.g., to the right of second end 130 in the direction of Arrow P) is increased by a change in speed of the pump, the additional flow/suction shifts the plug member 140 toward third end 150 of lumen 200, and the plug member 140 can move to a second position (e.g., via compression of spring member 160) that thereby covers the provided flow paths of slots 138 from the pool/spa water, while opening a flow path from the suction cleaner.

More particularly, when the plug member 140 shifts or moves toward third end 150 of lumen 200 to the second position as shown in FIG. 6, the extension wall 128 of plug member 140 is configured to cover the slots 138 of outer wall 242 to prevent fluid to flow through each slot 138 to lumen 180, and the plug member 140 is also now positioned so that the first plug end 126 is positioned away from inner wall 121 of first lumen 180, with the first plug end 126 allowing fluid to flow around or under first plug end 126 and from first end 110 to second end 130, when first plug end 126 is in the second position shown in FIG. 6. Fluid can then flow through lumen 180 from first end 110 to second end 130 and towards the pump suction to the right of second end 130 in the direction of Arrow P, thereby allowing the suction cleaner to operate/move.

In exemplary embodiments, the slots 138 and extension wall 128 are sized and configured such that when the entire flow is through the suction cleaner as shown in FIG. 6, the cleaner is within its designed operating conditions.

As shown in FIG. 7, if the pump provides flow/suction above/beyond the designed operation conditions of the cleaner, the plug member 140 will move further toward third end 150 of lumen 200 (e.g., to a third position via further compression of spring member 160), and the first plug end 126 and/or extension wall 128 will start to provide at least a partial opening through one or more slots 138 to bypass some flow/suction to the cleaner by allowing some fluid flow from the pool/spa to pass through at least partially opened slots 138 to lumen 180 and then to second end 130 and then to the pump.

As such, the present disclosure provides for improved systems/methods for utilizing flow control valve assemblies 100 for pool/spa cleaners (e.g., for suction pool/spa cleaners, with the suction cleaners utilized in conjunction with a variable speed pump or the like).

More particularly, the present disclosure provides that a conventional manual set-up can be replaced or removed from the system, and an advantageous flow control valve assembly 100 can be provided to automatically set or regulate the flow/suction to the cleaner. The improved flow control valve assembly 100 thereby provides regulated flow to the cleaner, so that if the suction cleaner remains in the water (e.g., during a lower pump speed setting), when the pump is thereafter engaged to a higher speed the suction cleaner will operate/move as designed. When there is flow/suction below the desired operating parameters of the cleaner, the pump will operate as desired, and the suction cleaner will be stationary and not move.

Another exemplary additional function of the advantageous flow control valve assembly 100 is to maintain the suction cleaner at the designed flow/suction requirements of the cleaner, even when the furnished pump flow/suction of the fluid system is above the designed flow/suction of the cleaner. As such, the above noted improvements of the systems/assemblies 100 of the present disclosure thereby eliminate drawbacks of conventional designs, and also provide significant operational, commercial and/or manufacturing advantages as a result.

FIGS. 8-9 show side views of another exemplary flow control valve assembly 500 of the present disclosure.

Similar to assembly 10 and 100, exemplary flow control valve assembly 500 can be utilized in fluid systems (e.g., pool or spa systems) as a flow control assembly. More particularly, flow control valve assembly 500 can be utilized in pool or spa systems as a flow control assembly for pool/spa cleaners (e.g., cleaners utilized in conjunction with a variable speed pump).

In general, a remote suction system includes at least one pump (e.g., variable speed pump) that is connected via a hose or the like to the cleaner for cleaning purposes. The flow control valve assembly 500 can be connected to the fluid system (e.g., connected to the hose) for flow control purposes.

Exemplary flow control valve assembly 500 includes body member 512, plug or plunger member 514 and spring member 516.

Body member 512 of flow control valve assembly 500 extends from a first open end 511 to a second open end 513.

Hose segments of the hose of the fluid system (e.g., pool or spa cleaner system) can be configured to connect to first and second open ends 511, 513. In some embodiments, first open end 511 can be connected to the cleaner of the fluid system.

Body member 512 includes a first lumen or cavity 180 that extends from first open end 511 to second open end 513.

Body member 512 also includes a second lumen or cavity 520 that extends from first outer wall 524 of body member 512 to a third end 515. Third end 515 can be closed off by a mounted cap member 575 or the like. Second lumen 520 is configured and dimensioned to at least partially house or contain plug member 514 and spring member 516.

First outer wall 524 of body member 512 surrounds and defines first lumen 518. Second outer wall 542 of body member 512 extends from first outer wall 524 to third end 515, and second outer wall 542 of body member 512 surrounds and defines second lumen 520.

A plug or plunger member 514 is positioned at least partially within second lumen 520.

In exemplary embodiments and as shown in FIG. 9, plug member 514 is first positioned so that a first plug end 526 is positioned against or proximal to inner wall 521 of first lumen 518.

In such a position as shown in FIG. 9, the first plug end 526 of plug member 514 is configured and dimensioned to substantially prevent fluid to flow from first open end 511 to second open end 513.

In such a position, the pump suction is to the right of second end 513 of first lumen 518 in the direction of Arrow P, and the cleaner is positioned to the left of first end 511 of first lumen 518.

Plug member 514 also includes an extension wall 528 that extends from first plug end 526 to second plug end 527. Extension wall 528 includes one or more openings 532 therethrough.

Spring member 516 can be positioned against an inner surface 574 of plug member 514, with the spring member 516 extending from the inner surface 574 of plug member 514 to an abutment wall 534 of cap member 575 mounted to third end 515. It is noted that the mounting of cap member 575 to third end 515 is adjustable, thereby allowing a user to adjust the stiffness or looseness of the compression of spring member 516 positioned between inner surface 574 and abutment wall 534 as shown in FIG. 9.

The second outer wall 542 of body member 512 that surrounds and defines lumen 520 includes one or more slots 538 therethrough.

In use, the flow control valve assembly 500 is configured to provide sufficient flow area to allow the pump to maintain the circulation in the fluid system, when the pump is set below the required suction cleaner required flow (e.g., when the pump provides inadequate vacuum to operate the cleaner). Then, as the flow/vacuum of the pump/system increases to the desired level of the suction cleaner, the flow control valve assembly 500 can shift the flow into the suction cleaner in order to operate the suction cleaner.

The flow control valve assembly 500 includes an arrangement of the plug member 514 and spring member 516 that allows for high flows with low head loss. As shown in FIG. 9, plug member 514 can be first positioned so that a first plug end 526 is positioned against or proximal to inner wall 521 of first lumen 518, with the first plug end 526 substantially preventing fluid to flow from first open end 511 to second open end 513.

In such a position, the pump suction is to the right of second end 513 in the direction of Arrow P, and the cleaner is positioned to the left of first end 511.

Also in the position as shown in FIG. 9, the one or more slots 538 of second outer wall 542 and the one or more openings 532 of extension wall 528 of plug member 514 are configured to allow fluid (e.g., pool or spa water) to flow from the pool or spa and through the slots 538 and openings 532 and through or around plug member 514 and to the lumen 518 positioned to the right of plug member 514 in FIG. 9, and thereafter flow through lumen 518 and towards the pump suction to the right of second end 513 in the direction of Arrow P. This provides the flow back to the pump in this position as depicted in FIG. 9. As such and as shown in FIG. 9, pump suction of the fluid system is maintained, while the flow through the suction cleaner is substantially stopped.

As the flow/suction to the pump (e.g., to the right of second end 513 in the direction of Arrow P) is increased by a change in speed of the pump, the additional flow/suction shifts the plug member 514 toward third end 515 of lumen 520, and the plug member 514 can move to a second position (e.g., via compression of spring member 516) that thereby covers the provided flow paths of slots 538 from the pool/spa water via wall 528, while opening a flow path from the suction cleaner.

More particularly, when the plug member 514 shifts or moves toward third end 515 of lumen 520 to the second position, the extension wall 528 of plug member 514 is configured to cover the slots 538 of outer wall 542 to prevent fluid to flow through each slot 538 to lumen 518, and the plug member 514 is also now positioned so that the first plug end 526 is positioned away from inner wall 521 of first lumen 518, with the first plug end 526 allowing fluid to flow around or under first plug end 526 and from first end 511 to second end 513, when first plug end 526 is in the second position. Fluid can then flow through lumen 518 from first end 511 to second end 513 and towards the pump suction to the right of second end 513 in the direction of Arrow P, thereby allowing the suction cleaner to operate/move.

In exemplary embodiments, the slots 538 and extension wall 528 are sized and configured such that when the entire flow is through the suction cleaner, the cleaner is within its designed operating conditions.

In exemplary embodiments, if the pump provides flow/suction above/beyond the designed operation conditions of the cleaner, the plug member 514 will move further toward third end 515 of lumen 520 (e.g., to a third position via further compression of spring member 516), and the first plug end 526 and/or extension wall 528 will start to provide at least a partial opening through one or more slots 538 to bypass some flow/suction to the cleaner by allowing some fluid flow from the pool/spa to pass through at least partially opened slots 538 to lumen 518 and then to second end 513 and then to the pump.

As shown in FIGS. 8-9, flow control valve assembly 500 also includes a third lumen 522 extending from first outer wall 524 of body member 512 to second lumen 520 (e.g., to third end 515 of second lumen 520), thereby allowing second lumen 520 and first lumen 518 to be in suction communication with one another via third lumen 522.

Third outer wall 544 surrounds and defines third lumen 522. Exemplary third outer wall 544 is substantially cylindrical, although the present disclosure is not limited thereto. Rather, it is noted that third outer wall 544 can take a variety of shapes and forms.

In certain embodiments, third outer wall 544 is snap-fit or mounted to first outer wall 524 and to second outer wall 542. In other embodiments, it is noted that third outer wall 544 can be integral with first outer wall 524 and/or with second outer wall 542.

In exemplary embodiments and as shown in FIG. 9, second lumen 520 includes a first lumen area 520A and a second lumen area 520B. First lumen area 520A extends from first outer wall 524 to a transition position 552 along second outer wall 542. Second lumen area 520B extends from the transition position 552 along second outer wall 542 to the third end 515 of second lumen 520.

In exemplary embodiments, the area defined by second lumen area 520B is greater or larger than the area defined by first lumen area 520A.

As noted, second lumen 520 and first lumen 518 are configured to be in suction communication with one another via third lumen 522. As such, when the flow/suction to the pump (e.g., to the right of second end 513 in the direction of Arrow P) is increased by a change in speed of the pump, the additional flow/suction from second lumen 520 to first lumen 518 via third lumen 522 facilitates shifting the plug member 514 toward third end 515 of lumen 520 (e.g., to the second or third positions discussed above). Moreover, the larger second lumen area 520B facilitates shifting the plug member 514 toward third end 515 of lumen 520 when the flow/suction to the pump (e.g., to the right of second end 513 in the direction of Arrow P) is increased by a change in speed of the pump, by providing additional flow/suction from second lumen area 520B to first lumen 518 via third lumen 522.

As such, the present disclosure provides for improved systems/methods for utilizing flow control valve assemblies 500 for pool/spa cleaners (e.g., for suction pool/spa cleaners, with the suction cleaners utilized in conjunction with a variable speed pump or the like).

The present disclosure provides that a conventional manual set-up can be replaced or removed from the system, and an advantageous flow control valve assembly 500 can be provided to automatically set or regulate the flow/suction to the cleaner. The improved flow control valve assembly 500 thereby provides regulated flow to the cleaner, so that if the suction cleaner remains in the water (e.g., during a lower pump speed setting), when the pump is thereafter engaged to a higher speed the suction cleaner will operate/move as designed. When there is flow/suction below the desired operating parameters of the cleaner, the pump will operate as desired, and the suction cleaner will be stationary and not move.

Another exemplary additional function of the advantageous flow control valve assembly 500 is to maintain the suction cleaner at the designed flow/suction requirements of the cleaner, even when the furnished pump flow/suction of the fluid system is above the designed flow/suction of the cleaner. As such, the above noted improvements of the systems/assemblies 500 of the present disclosure thereby eliminate drawbacks of conventional designs, and also provide significant operational, commercial and/or manufacturing advantages as a result.

FIGS. 10-13 show views of another exemplary flow control valve assembly 600 of the present disclosure.

Similar to assembly 10, 100, 500, exemplary flow control valve assembly 600 can be utilized in fluid systems (e.g., pool or spa systems) as a flow control assembly. More particularly, flow control valve assembly 600 can be utilized in pool or spa systems as a flow control assembly for pool/spa cleaners (e.g., cleaners utilized in conjunction with a variable speed pump).

In general, a remote suction system includes at least one pump (e.g., variable speed pump) that is connected via a hose or the like to the cleaner for cleaning purposes. The flow control valve assembly 600 can be connected to the fluid system (e.g., connected to the hose) for flow control purposes.

Exemplary flow control valve assembly 600 includes body member 612, plug or plunger member 614 and spring member 616.

Body member 612 of flow control valve assembly 600 extends from a first open end 611 to a second open end 613.

Hose segments of the hose of the fluid system (e.g., pool or spa cleaner system) can be configured to connect to first and second open ends 611, 613. In some embodiments, first open end 611 can be connected to the cleaner of the fluid system.

Body member 612 includes a first lumen or cavity 618 that extends from first open end 611 to interior chamber 622 of body member 612. Body member 612 also includes a second lumen or cavity 620 that extends from second open end 613 to interior chamber 622 of body member 612. Exemplary interior chamber 622 extends from first chamber end 621 to second chamber end 623. As such, first lumen 618 extends from first open end 611 to first chamber end 621, and second lumen 620 extends from second open end 613 to second chamber end 623.

Outer wall 624 of body member 612 surrounds and defines first lumen 618, second lumen 620 and interior chamber 622.

A plug member 614 is positioned within interior chamber 622 of body member 612. In exemplary embodiments and as shown in FIG. 11, plug member 14 is first positioned so that a plug wall 626 is positioned against first chamber end 621, and plug wall 626 is configured and dimensioned to prevent fluid to flow from first lumen 618 to interior chamber 622 when plug wall 626 is in the first position against first chamber end 621. In such a position, the pump suction is to the right of second end 613 of second lumen 620 in the direction of Arrow P, and the cleaner is positioned to the left of first end 611 of first lumen 618.

As shown in FIG. 11, plug member 614 also includes an extension wall 628 that extends from plug member 614, the extension wall 628 including one or more protruding cover members 632.

As shown in FIG. 11, a spring member 616 is positioned against a surface of retaining member 617 of plug member 614, with the spring member 616 extending from the retaining member 617 of plug member 14 to an abutment wall 634 of retaining member 619 positioned proximal to second chamber end 623 of interior chamber 622 and/or proximal to second lumen 620.

The outer wall 624 of body member 612 that surrounds and defines interior chamber 622 includes one or more primary slots 638 therethrough, and one or more secondary slots 639 therethrough. In exemplary embodiments, the primary slots 638 provide bigger or wider openings/slots 638 through outer wall 624 compared to the size of secondary openings/slots 639 through outer wall 624, although the present disclosure is not limited thereto.

In exemplary embodiments, outer wall 624 includes two primary slots 638 spaced (e.g., spaced radially) around outer wall 624 (e.g., with the slots 638 spaced equidistantly apart from one another about 180° from each other around outer wall 624), and outer wall 624 includes two secondary slots 639 spaced (e.g., spaced radially) around outer wall 624 (e.g., with the slots 639 spaced equidistantly apart from one another about 180° from each other around outer wall 624). Other variations, permutations and spacing configurations of slots 638, 639 through outer wall 624 are to be appreciated.

In exemplary embodiments, the at least one primary slot 638 is positioned a first distance along outer wall 624 away from first chamber end 621, and the at least one secondary slot 639 is positioned a second distance along outer wall 624 away from first chamber end 621. In certain embodiments, the at least one secondary slot 639 is positioned farther away from first chamber end 621 than the at least one primary slot 638 (FIG. 11).

In use, the flow control valve assembly 600 is configured to provide sufficient flow area to allow the pump to maintain the circulation in the fluid system, when the pump is set below the required suction cleaner required flow (e.g., when the pump provides inadequate vacuum to operate the cleaner). Then, as the flow/vacuum of the pump/system increases to the desired level of the suction cleaner, the flow control valve assembly 600 can shift the flow into the suction cleaner in order to operate the suction cleaner.

The flow control valve assembly 600 includes an inline arrangement of the plug member 614 and spring member 616 that allows for high flows with low head loss. As noted above and as shown in FIG. 11, plug member 614 can be first positioned so that plug wall 626 is positioned against first chamber end 621, with the plug wall 626 preventing fluid to flow from first lumen 618 to interior chamber 622 when plug wall 626 is in the first position against first chamber end 621. In such a position, the pump suction is to the right of second end 613 of second lumen 620 in the direction of Arrow P, and the cleaner is positioned to the left of first end 611 of first lumen 618.

Also in the position as shown in FIG. 11, the one or more slots 638, 639 are configured to allow fluid (e.g., pool or spa water) to flow from the pool or spa and into the interior chamber 622, and thereafter flow through second lumen 620 and towards the pump suction to the right of second end 613 in the direction of Arrow P. This provides the flow back to the pump in this position as depicted in FIG. 11. As such and as shown in FIG. 11, pump suction of the fluid system is maintained, while the flow through the suction cleaner is stopped.

With reference again to FIG. 11, as the flow/suction to the pump (e.g., to the right of second end 613 in the direction of Arrow P) is increased by a change in speed of the pump, the additional flow/suction shifts the plug member 614 to the right in the direction of Arrow P, and the plug member 614 can move to a second position (e.g., via compression of spring member 616) that thereby covers the provided flow paths of slots 638 from the pool/spa water, while opening a flow path from the suction cleaner.

More particularly, when the plug member 614 shifts to the right in the direction of Arrow P to the second position, each protruding cover member 632 is configured to cover a respective primary slot 638 to prevent fluid to flow through each primary slot 638 to the interior chamber 622, and the plug member 614 is also now positioned so that plug wall 626 is positioned away from first chamber end 621, with the plug wall 626 allowing fluid to flow around plug wall 626 and into chamber 622 from first lumen 618 to interior chamber 622 when plug wall 626 is in the second position away from first chamber end 621. Fluid can then flow from first lumen 618 to interior chamber 622, and then through second lumen 620 and towards the pump suction to the right of second end 613 in the direction of Arrow P, thereby allowing the suction cleaner to operate/move.

In certain embodiments, it is noted that when the plug member 614 shifts to the right in the direction of Arrow P to the second position, each protruding cover member 632 is configured to cover a respective primary slot 638 to prevent fluid to flow through each primary slot 638 to the interior chamber 622, while fluid can still flow through the one or more secondary slots 639 to the interior chamber 622 and then to second lumen 620 and towards the pump suction to the right of second end 613.

In other embodiments, it is noted that assembly 600 may not include the one or more secondary slots 639, and when the plug member 614 shifts to the right in the direction of Arrow P to the second position, each protruding cover member 632 is configured to cover a respective primary slot 638 to prevent fluid to flow through each primary slot 638 to the interior chamber 622.

In further embodiments, it is noted that assembly 600 may or may not include the one or more secondary slots 639, and when the plug member 614 shifts to the right in the direction of Arrow P to the second position, each protruding cover member 632 is configured to partially cover a respective primary slot 638 to partially prevent fluid to flow through each primary slot 638 to the interior chamber 622, while also allowing a smaller amount of fluid to flow through each partially covered primary slot 638.

In exemplary embodiments, the slots 638 and protruding cover members 632 are sized and configured such that when the substantially entire flow is through the suction cleaner, the cleaner is within its designed operating conditions.

In some embodiments, if the pump provides flow/suction above/beyond the designed operation conditions of the cleaner, the plug member 614 will move further to the right in the direction of Arrow P (e.g., to a third position via compression of spring member 616), and each protruding cover member 632 will start to provide at least a partial opening through a respective slot 638 to bypass some flow/suction to the cleaner by allowing some fluid flow from the pool/spa to pass through at least partially opened slots 638 to chamber 622 and then to second lumen 620 and then to the pump.

As such, the present disclosure provides for improved systems/methods for utilizing flow control valve assemblies 600 for pool/spa cleaners (e.g., for suction pool/spa cleaners, with the suction cleaners utilized in conjunction with a variable speed pump or the like).

More particularly, the present disclosure provides that a conventional manual set-up can be replaced or removed from the system, and an advantageous flow control valve assembly 600 can be provided to automatically set or regulate the flow/suction to the cleaner. The improved flow control valve assembly 600 thereby provides regulated flow to the cleaner, so that if the suction cleaner remains in the water (e.g., during a lower pump speed setting), when the pump is thereafter engaged to a higher speed the suction cleaner will operate/move as designed. When there is flow/suction below the desired operating parameters of the cleaner, the pump will operate as desired, and the suction cleaner will be stationary and not move.

Another exemplary additional function of the advantageous flow control valve assembly 600 is to maintain the suction cleaner at the designed flow/suction requirements of the cleaner, even when the furnished pump flow/suction of the fluid system is above the designed flow/suction of the cleaner. As such, the above noted improvements of the systems/assemblies 600 of the present disclosure thereby eliminate drawbacks of conventional designs, and also provide significant operational, commercial and/or manufacturing advantages as a result.

In certain embodiments and as shown in FIGS. 12-13, flow control valve assembly 600 includes screen or mesh member 680. For example, screen/mesh member 680 can be mounted with respect to body member 612 (e.g., mounted to outer wall 624).

In general, screen/mesh member 680 includes a plurality of holes 682 therethrough, the holes 682 smaller in size compared to slots 638, 639. As such, screen/mesh member 680 is configured and dimensioned to protect slots 638, 639 of outer wall 624 of body member 612 from getting clogged by debris or the like (e.g., from getting clogged with debris in the skimmer).

In exemplary embodiments, screen/mesh member 680 takes the form of a molded member 680, or it can take the form of mesh member 680 or the like (e.g., a plastic or metal mesh member 680). In general, the exemplary hole 682 sizes are smaller than the slots 638, 639 in the body member 612 of assembly 600 to facilitate that substantially no debris gets trapped in slots 638, 639 and block flow through slots 638, 639 and prevent the valve assembly 600 from working as intended.

Although the assemblies, systems and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

The invention claimed is:

1. A flow control valve assembly comprising:
a body member extending from a first open end to a second open end, the body member having a first lumen that extends from the first open end to an interior chamber of the body member, and a second lumen that extends from the second open end to the interior chamber;
an outer wall of the body member that surrounds and defines the first lumen, the second lumen and the interior chamber, the outer wall including a first slot therethrough;
a plug member and a spring member positioned within the interior chamber, the plug member including a first protruding cover member;
wherein when the plug member is in a first position within the interior chamber: (i) the plug member prevents fluid to flow from the first lumen to the interior chamber, and (ii) fluid can flow from outside the outer wall to the interior chamber via the first slot; and
wherein when the plug member is moved to a second position within the interior chamber via a suction force: (i) the plug member allows fluid to flow from the first lumen to the interior chamber, and (ii) the first protruding cover member covers the first slot and prevents fluid to flow from outside the outer wall to the interior chamber via the first slot.

2. The assembly of claim 1, wherein the body member is substantially cylindrical.

3. The assembly of claim 1, wherein the interior chamber extends from a first chamber end to a second chamber end, and the first lumen extends from the first open end to the first chamber end, and the second lumen extends from the second open end to the second chamber end.

4. The assembly of claim 3, wherein the plug member includes a plug wall; and
wherein when the plug member is in the first position, the plug wall is positioned against the first chamber end to prevent fluid to flow from the first lumen to the interior chamber.

5. The assembly of claim 4, wherein when the plug member is moved to the second position, the plug wall is positioned away from the first chamber end to allow fluid to flow from the first lumen to the interior chamber.

6. The assembly of claim 3, wherein the spring member extends from the plug member to an abutment wall positioned proximal to the second chamber end.

7. The assembly of claim 6, wherein the abutment wall includes an aperture therethrough to allow fluid to flow therethrough.

8. The assembly of claim 1, wherein the plug member includes a second protruding cover member, a third protruding cover member, and a fourth protruding cover member;
wherein the outer wall of the body member includes a second slot therethrough, a third slot therethrough, and a fourth slot therethrough; and
wherein when the plug member is in the first position, fluid can flow from outside the outer wall to the interior chamber via the first, second, third and fourth slots.

9. The assembly of claim 8, wherein when the plug member is moved to the second position, the second protruding cover member covers the second slot and prevents fluid to flow from outside the outer wall to the interior chamber, and the third protruding cover member covers the third slot and prevents fluid to flow from outside the outer wall to the interior chamber, and the fourth protruding cover member covers the fourth slot and prevents fluid to flow from outside the outer wall to the interior chamber.

10. The assembly of claim 8, wherein the first, second, third and fourth protruding cover members are radially spaced equidistantly apart from one another about 90° from each other around the plug member; and
wherein the first, second, third and fourth slots are radially spaced equidistantly apart from one another about 90° from each other around the outer wall.

11. The assembly of claim 1, wherein the first open end of the body member is mounted with respect to a pool or spa cleaner, and the second open end of the body member is mounted with respect to a suction system.

12. The assembly of claim 1, wherein the interior chamber includes a rib member extending along an interior surface of the outer wall, the rib member configured to maintain the orientation of the first protruding cover member in axial alignment with the first slot.

13. The assembly of claim 1, wherein when the plug member is moved to the second position, the spring member is compressed.

14. The assembly of claim 1, wherein when the plug member is moved to a third position within the interior chamber via the suction force: (i) the plug member allows fluid to flow from the first lumen to the interior chamber, and (ii) fluid can flow from outside the outer wall to the interior chamber via the first slot.

15. The assembly of claim 1, wherein the first open end of the body member is mounted with respect to a pool or spa suction cleaner, and the second open end of the body member is mounted with respect to a variable speed pump.

16. The assembly of claim 1, wherein the outer wall of the body member includes a second slot therethrough;
wherein when the plug member is in the first position, fluid can flow from outside the outer wall to the interior chamber via the first and second slots; and
wherein when the plug member is moved to the second position, fluid can flow from outside the outer wall to the interior chamber via the second slot.

17. The assembly of claim 1, further including a screen member mounted to the body member, the screen member including a plurality of holes therethrough, each hole of the plurality of holes smaller in size compared to the first slot.

18. A flow control valve assembly comprising:
a body member extending from a first open end to a second open end, the body member having a first lumen that extends from the first open end to the second open end, and a second lumen that extends from a first outer wall to a third end, the first outer wall of the body member surrounding and defining the first lumen;
a second outer wall of the body member that surrounds and defines the second lumen, the second outer wall including a first slot therethrough;
a plug member and a spring member positioned at least partially within the second lumen, the plug member including an extension wall having a first opening therethrough;
wherein when the plug member is in a first position within the first lumen: (i) the plug member substantially prevents fluid to flow from the first open end to the second open end, and (ii) fluid can flow from outside the second outer wall to the first lumen via the first slot and first opening; and
wherein when the plug member is moved to a second position within the second lumen via a suction force: (i) the plug member allows fluid to flow from the first open end to the second open end, and (ii) the extension wall covers the first slot and prevents fluid to flow from outside the outer wall to the first lumen.

19. The assembly of claim 18, wherein the spring member extends from an inner surface of the plug member to an abutment wall of a cap member mounted to the third end.

20. The assembly of claim 18, wherein the plug member includes a first plug end; and
wherein when the plug member is in the first position, the first plug end is positioned proximal an inner wall of the first lumen to prevent fluid to flow from the first open end to the second open end.

21. The assembly of claim 18, wherein the first open end of the body member is mounted with respect to a pool or spa cleaner, and the second open end of the body member is mounted with respect to a suction system.

22. The assembly of claim 18, wherein when the plug member is moved to the second position, the spring member is compressed.

23. The assembly of claim 18 further comprising a third lumen extending from the first outer wall to the second lumen, thereby allowing the second lumen and the first lumen to be in suction communication with one another via the third lumen.

24. The assembly of claim 23, wherein a third outer wall surrounds and defines the third lumen, the third outer wall substantially cylindrical and configured to be snap-fit or mounted to the first outer wall and to the second outer wall.

25. A flow control valve assembly comprising:
- a body member extending from a first open end to a second open end, the body member having a first lumen that extends from the first open end to an interior chamber of the body member, and a second lumen that extends from the second open end to the interior chamber;
- an outer wall of the body member that surrounds and defines the first lumen, the second lumen and the interior chamber, the outer wall including a first slot therethrough;
- a plug member and a spring member positioned within the interior chamber, the plug member including a first protruding cover member;
- wherein when the plug member is in a first position within the interior chamber: (i) the plug member prevents fluid to flow from the first lumen to the interior chamber, and (ii) fluid can flow from outside the outer wall to the interior chamber via the first slot; and
- wherein when the plug member is moved to a second position within the interior chamber via a suction force: (i) the plug member allows fluid to flow from the first lumen to the interior chamber, and (ii) the first protruding cover member partially covers the first slot and partially prevents fluid to flow from outside the outer wall to the interior chamber via the first slot.

* * * * *